United States Patent [19]

Freeman

[11] 4,134,248
[45] Jan. 16, 1979

[54] CONTAINER CAPPING APPARATUS AND METHOD THEREFOR

[75] Inventor: Warren R. Freeman, Wayzata, Minn.

[73] Assignee: Kup Kap, Inc., Minneapolis, Minn.

[21] Appl. No.: 684,879

[22] Filed: May 10, 1976

[51] Int. Cl.² ............................ B67B 5/00; B65B 7/28
[52] U.S. Cl. ........................................... 53/298; 53/329
[58] Field of Search ................... 53/41, 42, 30 S, 296, 53/297, 298, 329, 389

[56] References Cited

U.S. PATENT DOCUMENTS

| Re. 28,584 | 10/1975 | Marion et al. | 53/329 X |
|---|---|---|---|
| 3,491,510 | 1/1970 | Sternau | 53/42 |
| 3,507,093 | 4/1970 | Marion | 53/296 X |
| 3,693,318 | 9/1972 | Balzer et al. | 53/329 |
| 3,716,963 | 2/1973 | Amberg | 53/329 X |
| 3,877,200 | 4/1975 | Feldman | 53/329 X |

Primary Examiner—Horace M. Culver
Attorney, Agent, or Firm—Herbert M. Adrian, Jr.

[57] ABSTRACT

An apparatus and method is provided for the placement of a heat-shrinkable film over the open portion of a container such as a glass, paper or plastic cup. The apparatus is particularly suitable for rapid placement of a heat-shrinkable film on food and beverage containers such as are commonly used in the fast-food service business. The apparatus comprises a film transport subsystem for withdrawing heat shrinkable film from a supply roll, cutting the film to size and positioning it for shrinkage onto a container and a heating subsystem which shrinks the film onto the top of a container. Operation of the apparatus is initiated by manual placement of the top of a container to be covered, against the film, pushing the container and film upwardly into the apparatus. The upward movement of the container engages the film and container top with a bonnet which initiates blowing of hot air of heat shrinkable temperatures to heat the exposed edges of the film and shrink the film onto the container. Downward movement of the capped container away from the apparatus shuts off the blower and initiates recycling of the transport system to convey a new film into position for the capping of another container. The apparatus is designed to cap and recycle in a time interval of approximately one second.

7 Claims, 6 Drawing Figures

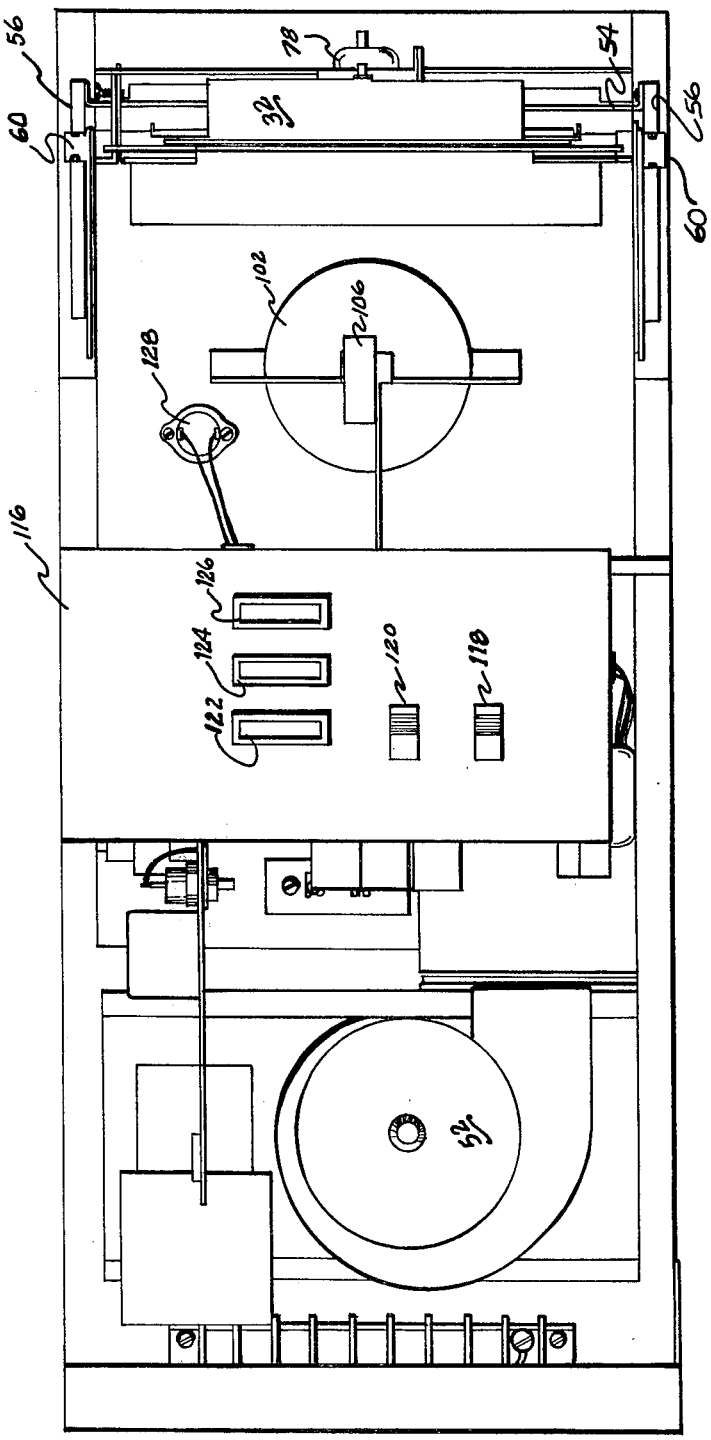

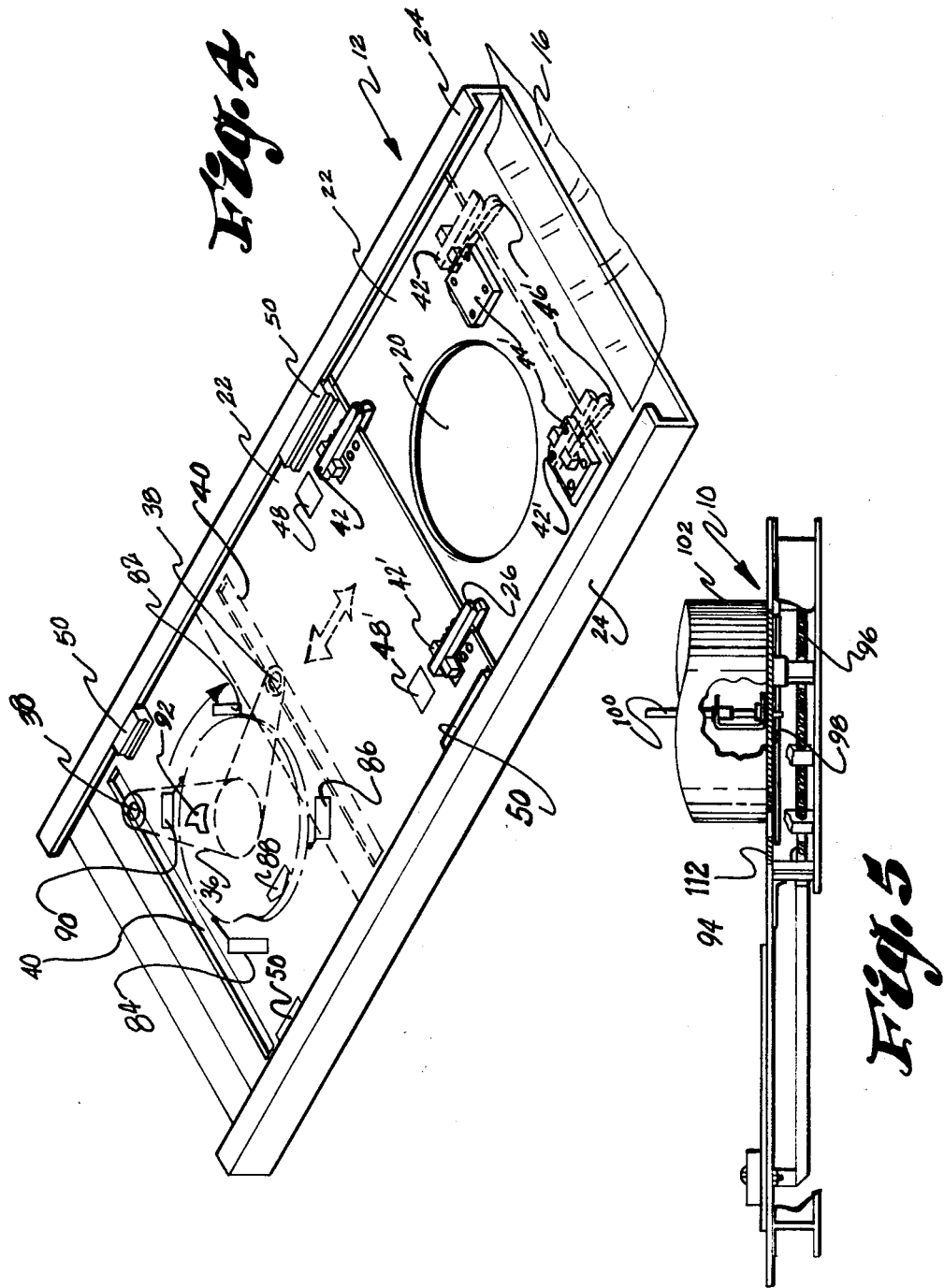

CONTAINER CAPPING APPARATUS AND METHOD THEREFOR

This invention is directed to the rapid capping of containers utilizing a heat-shrinkable film. More particularly, the invention is directed to the capping of food and beverage containers in a manner particularly suitable for use in the fast-food service industry wherein a variety of different size individual containers are frequently covered to prevent spillage and to protect contents from possible contamination.

BACKGROUND OF THE INVENTION

Numerous methods are known for the closing of beverage and food containers. Such containers are composed of various material such as paper, plastic or glass. Generally, these containers are cylindrical with a circular open end for drinking or removing the contents thereof. Various pre-sized caps or covers are known and often used to cover these containers. Such covers can be merely pressed onto the top of the container after the filling thereof. More recently, heat shrinkable film has been used, particularly in the mass production of fill containers. Generally, for such usage, the same size container is always capped. Other attemps have been made to incorporate more flexibility into heat-shrinkable film capping apparatuses. However, such apparatuses suffer from various limitations such as slow recycle time, the ability to cap only a single size container without substantial adjustment of the machine, the requirement of specially prepared films such as a rigid or precut film, lack of adaptability to the fast-food service industry and the like shortcomings.

There has been a significant incentive for perfecting an apparatus to accomplish a capping operation using an uncut supply roll of film because such a capping procedure would have a cost advantage of one-fifth to one-tenth that of preformed covers.

It is therefor an object of the present invention to provide an apparatus which is highly reliable and utilizes a very short recycle time.

It is another object of the present invention to provide an apparatus which is capable of capping containers of various sizes without adjustment to the apparatus.

It is a further object of the present invention to provide an apparatus which can utilize various types of flexible, heat shrinkable film without the requirement of pre-sizing or pre-cutting.

It is yet a further object of the present invention to provide an apparatus and method for capping containers at a fraction of the cost of preformed covers.

These and other objects of the present invention will become readily apparent from the description of the invention which follows.

THE INVENTION

An apparatus is provided for the placement of a heat shrinkable cover on a container, comprising a support housing containing a heat shrinkable film supply, film transport means comprised of film conveying, cutting and holding means, film heat shrinking means comprised of heating and blower means, an electrical actuating means comprised of movable bonnet means, said film transport means withdrawing and forwarding a predetermined length of film from said film supply and severing said film length from said supply, holding said film along its peripheral edges in operational alignment with said film heat-shrinking means and said bonnet means, electrically actuating said apparatus by movement of a container to be covered against said held film to contact and move said movable bonnet means to thereby released said held film from said transport means, the movement of said bonnet means actuating said blower and heating means, the movement of said container away from said bonnet means initiating a recycle of said film transport means.

Particularly desirable features of the present invention include hot wire severing means which sever the heat-shrinkable film from a continuous roll supply of film, and heater and blower actuation only when actually needed and used. The film transport system moves the film into alignment for the capping operation by means of a harmonic motion of the Scotch-yoke principle to move a slide back and forth on bearings between fixed points. The movement of the bonnet means initiates the heater and blower to heat-shrink the peripheral edges of the film as such edges are released from the holding means during the upward moving of a container against the bonnet means. The bonnet means in turn shields the covering section of the film, which is over the previously open portion of the container, from the effects of the heat.

DETAILS OF THE INVENTION

The invention will be described more fully by reference to the drawings in which:

FIG. 3 is a partially exposed top plan view along line 3 — 3 of the preferred embodiment of FIG. 1 showing the blower assembly, control panel, actuating switch and film severing means;

FIG. 4 is a plan view of the film forwarding means taken along line 4 — 4 of FIG. 1 illustrating the Scotch-yoke movement of the film transport means and the camming action of the film grasping means;

FIG. 5 is a partially exposed elevation view along line 5 — 5 of FIG. 1 showing a preferred heater assembly surrounded by the blower duct forming the heat shrinking zone and further illustrating the bonnet means and heat exhaust stack.

Referring more particularly to the drawings, FIGS. 1 through 6 illustrate a preferred embodiment of the present invention which provides automatic placement of a heat shrinkable film over the open end of a container in a recycle time of approximately one to two seconds. The apparatus is actuated by the placement of a container to be capped through the opening provided in the apparatus for the receipt of the top of the container. The upward movement of the container into the apparatus places a sheet of film across the top of the container and as the upward movement is continued, actuates the heater and blowing means thereby heat shrinking the film around the top sides of the container. A disc-shaped bonnet protects the portion of the film actually covering the top of the container so that that portion of the film is not affected by the heat. The recycling of a new sheet of film into position for another container capping is automatically triggered.

Figure 1:
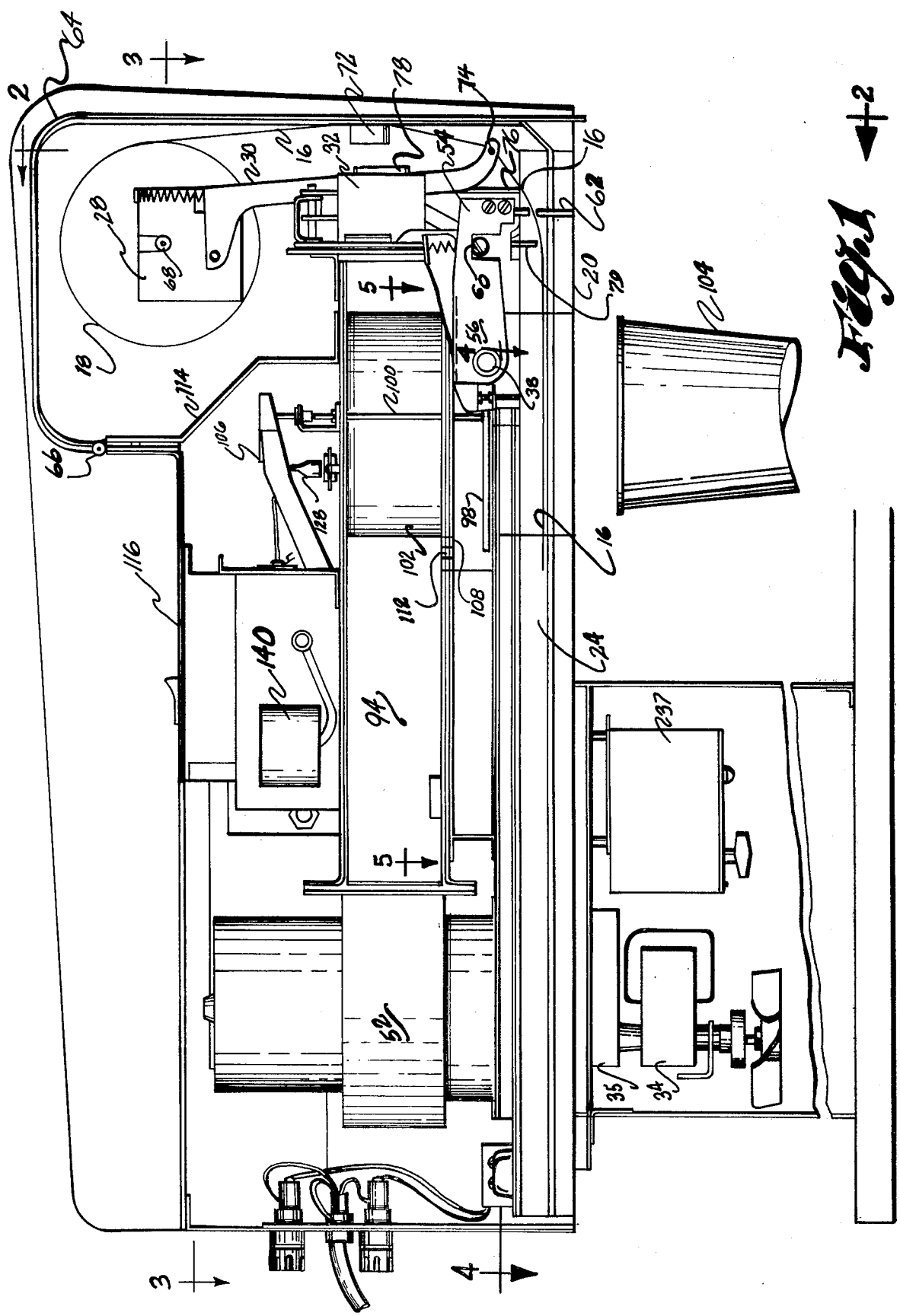
FIG. 1 is an exposed side elevation view of a preferred embodiment of the invention showing the basic component parts thereof.

The preferred apparatus is comprised of four basic subassemblies comprising (a) the heating subassembly 10 more particularly illustrated in FIGS. 1 and 5; (b) the film transport subassembly 12 more particularly illustrated in FIGS. 1 and 4; (c) the film holding subassembly more particularly illustrated in FIGS. 1 and 4; and (d) the electrical subassembly 14 more particularly illustrated in FIG. 6.

The film transport assembly 12 initiates the functioning of the apparatus by pulling a length of heat-shrinkable film 16 from roll 18 of continuous heat shrinkable film, cutting the continuous film into a predetermined length of approximately the width of the film or whatever length is desired, followed by supporting the cut film over opening 20 in position of readiness for use.

The transport subassembly 12 consists of reciprocal slide means 22 mounted in slide channel 24 which additionally forms the horizontal support members for the apparatus, film gripping means 26 mounted on said slide means 22, film roll holder means 28, film roll brake means 30, and film cutter means 32. Film cutter means 32 can be of any of the known film cutting means including scissors, knife severing means, perforated film sheet means or, more preferably, melt cutting means.

A closely related aspect of the film transport subassembly 12 is the film holding means which functions in conjunction with film transport means but which will be described separately.

Reciprocal slide means 22 is actuated by motor 34 which, through reduction gear 35, drives arm 36 in circular motion, one 360 degree turn, completing the reciprocal action of slide means 22. The operation of motor 34 and other functions are sequenced by switches actuated by cams affixed to a plate which is keyed to shaft 41 which turns arm 36. These cams and related switches, which are more specifically illustrated in the electrical diagrams of FIGS. 4 and 6, sequentially actuate film clamp assembly 54, film cutting means 32 and stops motor 34 when film 16 is in position for cutting. Restart timer 37 permits motor 34 to retun slide 22 a short distance rearward to its home position. During this short rearward movement to home position, the film is released by grips 26.

Arm 36 is attached to reciprocal slide means 22 through pivot bearing 38 in groove 40. As arm 36 traverses in circular motion in the Scotch-yoke principle, pivot bearing 38 in groove 40 pushes reciprocal slide means 22 in a linear forward and rearward movement.

As reciprocal slide means 22 moves forward, gripping means 42 and 42' are passed over camming means 44 and 44', thereby opening jaws 46 and 46' of gripping means 42 and 42' as slide means 22 nears the most forward position of the reciprocal cycle. Open jaws 46 and 46' slide across held film 16 and as cam 44 and 44' is passed, jaws 46 and 46' of gripping means 42 and 42' close, thereby grasping film 16. The rearward movement of slide means 22 pulls film 16 backwards in the completion of the reciprocal cycle of slide means 22. As film 16 is drawn by the backward motion of reciprocal slide means 22, it is drawn and positioned across opening 20. As slide means 22 nears the completion of its rearward movement, gripping means 42 and 42' again pass over rear camming means 48 and 48' which open jaws 46 and 46', thereby releasing film 16 in position over opening 20. Reciprocal slide means 22 is freely supported in slide channel 24 and rides on slide bearings 50 attached to slide channel 24.

At a position just short of the maximum rearward travel of slide means 22, film clamp assembly 54 positioned in the front of film transport subassembly 12 is actuated by switch 84 operated by clamp release cam 82, to close on film 16 by movement of clamp follower 56 which is pivoted on bearing 58 and controlled by cam 60 to thereby clamp film 16 between lower clamp 62 and clamp assembly 54. This clamping action holds a projecting end of film 16 across its width so that no additional film can be drawn off of film roll 18. The film thus held between gripping means 42 of slide means 22 and clamp assembly 54 is then cut one-quarter to one-half inch back of clamp assembly 54 toward gripping means 42 to thereby leave a short section of film 16 projecting from the clamp assembly 54. Reciprocal slide means 22 completes its short remaining rearward movement coupled with gripping means 42 and 42' being cammed open by rear camming means 48 and 48' to release the cut section of film. As the full revolution of arm 36 is completed, drop-out cam 92 momentarily opens drop-out reset switch 90 to stop motor 34 in the most rearward movement of slide 22, and resets the electrical control system for the next cycle of operation.

Film clamp assembly 54 retains the cut leading edge of film 16 coming from film roll 18 in alignment with gripping means 42 and 42' for a subsequent recycle and feeding of another film section into operating position.

Film clamp assembly 54 is controlled by cam 82 which effects the opening and closing of clamp follower 56 to clamp film 16 between lower clamp 62 and clamp assembly 54. Synchronization between the opening and closing of said clamp is effected by clamp release cam 82 which is in contact with clamp release switch 84 which effects the opening and closing of clamp assembly 54 in properly timed sequence as determined by the shaping and location of cam 82 with relation to swtich 84. Also located in operative relationship to clamp release cam 82 is film cutter switch 86 and cutter cam 88 which together actuate film cutter solenoid 78 in properly timed sequence. This sequence is preferably set to cut film 16 immediately as clamp assembly 54 is closed and just short of the most rearward movement of slide means 22.

Motor 34 is deactivated on the completion of one revolution of arm 36 by means of dropout reset switch 90 which terminates power to the motor when the switch contacts are opened by dropout cam 92 mounted for rotation with motor shaft 41. Reference to the electrical diagram of FIG. 6 more clearly illustrates the electrical contacts required to initiate the sequential functions completed by the film transport subassembly 12 in the cycling of a fresh film sheet into operative position. Restart timer 37 stops motor 34 momentarily in order to halt movement of film 16 at the moment the film is cut.

Figure 2:
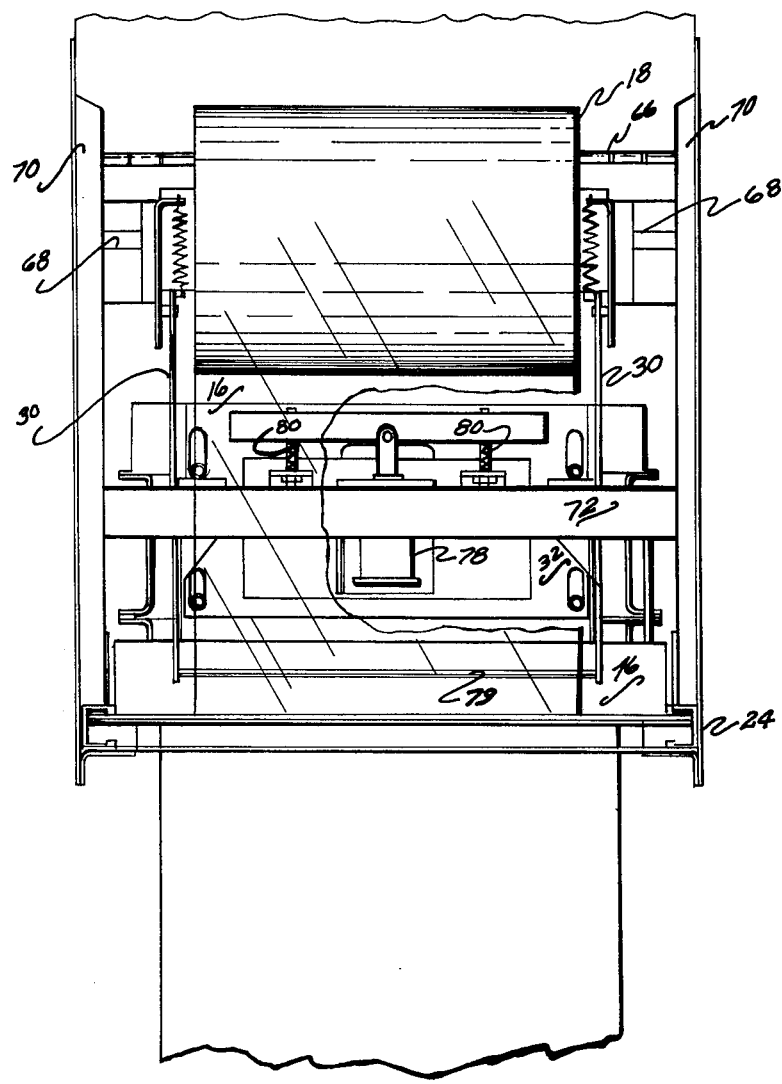
FIG. 2 is an exposed front elevation along line 2 — 2 of the preferred embodiment of FIG. 1 illustrating film supply roll mounting and severing means.
Figure 6:
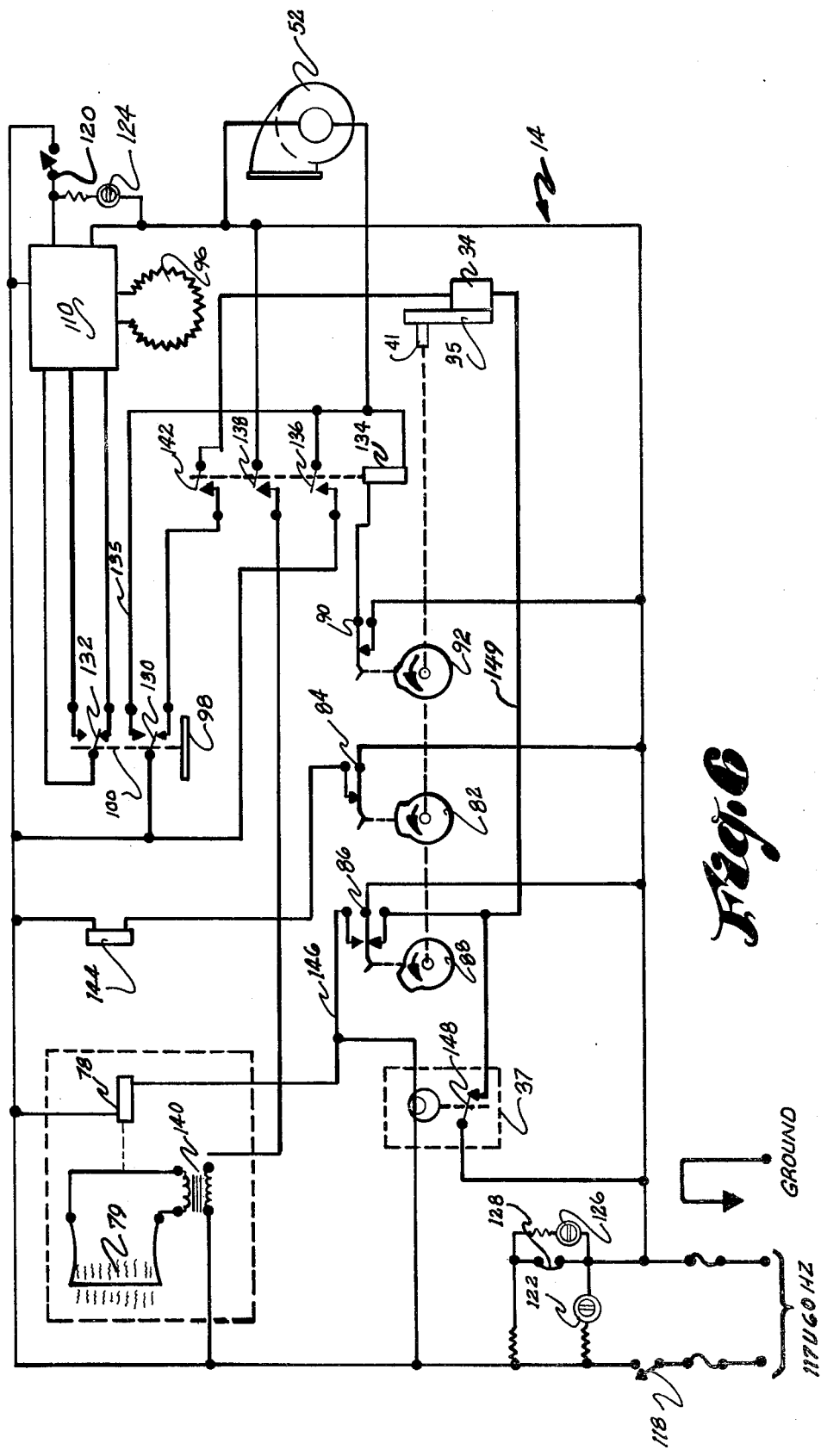
FIG. 6 is an electrical schematic for the embodiment of FIG. 1.

Referring more particularly to FIGS. 1 and 2, film supply means and severing means are more fully illustrated. Cover 64 is hinged 66 for easy access to film roll 18, which is mounted on roll holder means 28. Axle 68 is supported by a vertical roll support means 70. As the film 16 is unwound from roll 18, it is threaded across front film guide 72 over brake bar 74 across rear film guide 76 and through clamp assembly 54.

Film cutter means 32 is preferably a heated wire or knife which cuts the film transversely just past clamp assembly 54, thereby leaving a projecting film end of about one-quarter inch in length which is held in alignment for easy grasping by gripping means 42 in the film cycle.

Film cutting action is preferably by means of an electrically heated resistance wire which is moved downwardly across the plane of the film by means of solenoid 78. Film cutter means 32 is controlled as set forth in the electrical diagram which is more fully described hereinafter to move vertically downward about one-half inch when solenoid 78 is energized, thereby severing the film by means of heated wire 79 passing across the plane of the film. When the solenoid is de-energized, springs 80 return heated wire 79 to its starting position.

Film 16 can be held in position over opening 20 by one of several different means. One means is to utilize a vacuum plate operated by blower means 52 by channeling a portion of the input air requirements for said blower upward through holes in a perforated holding plate below which film 16 is positioned. Alternatively, a smaller blower motor might be used solely for the holding function. Another alternative is to utilize several vertical whiskers to support the cut film. Such whiskers are positioned along the outer edges of slide means 22 and around opening 20. As film 16 is drawn across the whiskers, the whiskers lift the film and hold it in the desired position, yet do not interfere with motion of the slide 22.

The heating subassembly 10 provides the heat which shrinks the film around the rim of a container or cup as it is raised into the heating chamber. The heating subassembly 10 consists of blower means 52, air duct 94, electrical heating elements 96, bonnet 98, blower-heater actuator stem 100, exhaust duct 102 and associated electrical switches.

The raising of container 104 into the apparatus by placement through opening 20 causes the top of container 104 to pass through the plane of the positioned film 16 with continued raising of container 104 to engage bonnet 98. The upward movement of bonnet 98 causes the activation of heat elements 96 and blower 52 by lifting bonnet switch lever 106. Bonnet 98 moves freely about one-half inch in a vertical direction within the limits set by attached blower-heater actuator stem 100. The upward movement of stem 100 lifts switch lever 106 which in turn actuates switches 130 and 132 to control blower and heater means as shown in the electrical diagram of FIG. 6.

The upward movement of bonnet 98 is limited by its striking heat shield 108 located at the bottom portion of exhaust duct 102. Heater elements 96 are preferably of the instant-heat variety so that they need only be energized when needed. The elements are brought to a high temperature for a period of approximately one second by a pulse of current at 110 to 120 volts when actuated by heat control circuit 110 initiated by tripping switch 132 by means of bonnet switch lever 106. Switch 130 operated by lever 106 additionally activates blower 52 which blows air through air duct 94 through a plurality of blower vent holes 112 across heating element 96, thereby directing hot air downward and against film 16 which is draped over the top of container 104. The downward movement of air through blower vent holes 112 forces the overlapping ends of film 16 downwardly and against the sides of container 104. At the same time, the heated air shrinks the film around the top sides of container 104. Bonnet 98 shields the covering portion of the film on the top of the container from the heat, thereby protecting it from the shrinkage effects of the heated air.

After an initial controlled surge of current to heating element 96, the heating element is de-energized. Then, as bonnet 98 is lowered, cooling air flows freely through the heating chamber past heating element 96 and against the top of bonnet 98 thereby diverting and directing the hot air to exhaust upward through exhaust duct 102 and out of the apparatus. Deflector 114 protects film roll 18 from the exhausted heat.

The electrical subassembly 14, more specifically the electrical control system, controls the sequences of operation needed to cycle the film transport subassembly, cut the film and heat shrink the film over the rim of a container. Reference in the preceding description of the apparatus has been made to various segments of the electrical system and the various electrical controls which are activated in various sequences in the operation of the apparatus. More specifically, the apparatus is preferably powered by conventional line voltages such as 115 to 120 volt 60 cycle current. It is recognized that in various locations, such as outside of continental United States, it may be desirable to operate the apparatus on other voltages and at other frequencies. This of course can be done with proper adaptation as is well known in the art. In the same manner, the apparatus can be powered by direct current and different voltages by adapting the various elements described herein to such a power source.

The apparatus preferably has control panel 116 located in a convenient position such as at the top of the apparatus. Control panel 116 has power switch 118 and heater switch 120 with corresponding indicator lights 122 and 124. Overheat light 126 is preferably used as a warning indicator. It is activated by temperature switch 128 at a preset temperature of, for instance, 160 degrees Fahrenheit. This is to notify of overheating of the apparatus which might adversely affect unused film.

With film in position for sealing onto the top of a container, when bonnet 98 is raised, switch 130 and switch 132 are tripped. Switch 130 initially energizes relay 134 via line 135. Power to relay 134 is then applied through closed relay contacts 136. Power to the relay is also routed to blower 52. Relay 134, when energized, additionally closes switch contact 138 which then supplies power to transformer 140. Transformer 140 supplies electrical power to heat resistance wire 79 of the film cutter means. Switch 132, which is also tripped as bonnet 98 is raised, energizes heat control circuit 110 which energizes heater elements 96.

When bonnet 98 is lowered, switch 130 changes contact position to transfer power through closed relay 134 switch contact 142 to motor 34 which powers arm 36 mounted on shaft 41 through reduction gear 35. In addition to arm 36, three camming means are mounted directly on the output shaft 41 of reduction gear 35. These cams, i.e. cutter cam 88, clamp release cam 82 and dropout cam 92 can be individual cams or combined into a unitary configuration which operates in conjunction with crank arm 36 which powers reciprocal slide means 22. When reciprocal slide means 22, driven by arm 36 reaches its maximum extension and gripping means 42 have closed on film 16, clamp release cam 82 closes switch 84 to energize clamp release solenoid 144 acting on clamp assembly 54. Solenoid 144 opens clamp assembly 54 to free film 16 so that the film can be freely withdrawn from film roll 18 as reciprocating slide means 22 retracts. When film of a predetermined length has been withdrawn from film roll 18, as measured by the retraction of slide 22, clamp release cam 82 opens clamp release switch 84 thereby de-energizing solenoid 144 causing clamp assembly 54 to lower onto the film 16 to thereby stop film withdrawal from roll 18.

At this point, cutter cam 88 actuates switch 86 by opening the contacts thereof, thereby interrupting electrical power to motor 34 and stopping the movement of slide 22. Switch 86, in interrupting power to motor 34, switches electrical power to line 146 which powers restart timer 37 and heated wire cutter solenoid 78. When restart timer 37 is energized, contacts 148 open and timer 37 commences a predetermined timing cycle of less than one second. On completion of the timing cycle, contacts 148 close thereby completing an electrical current path to motor 34. Concurrently with the initiation of the timing cycle, cutter solenoid 78 is actuated to effect passing of the heated resistance wire 79 through the plane of the film 16 at a point just behind slide 22 side of lower clamp 62.

The completion of restart timer's 37 cycle directs electrical energy to motor 34 via line 149 thereby restarting motor 34. This causes cutter cam 88 to open switch 86 to break electrical contact with line 146 thereby removing power from cutter solenoid 78. The de-energizing of solenoid 78 effects the withdrawal of the heated wire 79 upward from the plane of film 16. Additionally, the movement of cam 88 permits switch 86 to then complete contact with line 149, the circuit back to motor 34 thereby duplicating the circuit path to motor 34 both through switch 86 and contact 148.

With motor 34 in operation, slide 22 continues its retraction of approximately three-quarters of an inch, drawing the cut piece of film 16 with it. In this final slide 22 movement, gripping means 42 are cammed open and film sheet 16 is released from the grasp of gripping means 42. With slide 22 in the rearward or home position, drop-out cam 92 momentarily opens dropout reset switch 90 breaking the circuit to relay 134 causing it to de-energize. As relay 134 de-energizes, contact 136 opens thus removing locked-in power from relay 134 and to blower 52. Contact 138 also opens thus removing power to transformer 140 and hot wire 79. The mechanical inertia of moving slide 22 drives dropout reset cam 92 to a point far enough whereby dropout reset switch 90 again closes.

Heater control circuit 110 determines the length of time heater element 96 is on. Heater control circuit 110 is triggered by the raising of bonnet 98 and the closing of switch 132. Heater element 96 is preferably of the instant heating variety so that it can be utilized in an efficient on-again, off-again usage, i.e. only on demand such as when a container is being capped.

While the invention has been described in considerable detail with respect to preferred embodiments thereof, it should be pointed out that the particular heat shrinkable film used herein can be any of the known heat shrinkable films which are readily available on the open market. Such films are thermoplastic, preferably exhibiting bi-axial shrinkage characteristics. Such films are additionally highly flexible and drapable, particularly in desired thickness of film which is best utilized. Such films are preferably of a thickness no more than about 3 mils and more preferably 1 mil or less. The films are composed of thermoplastic synthetic polymers such as polyethylene terephthalate, polyethylene, polypropylene, polyvinylidene chloride and various other homo-or co-polymers. It is clear that the particular film being used does not greatly affect the operation of the apparatus provided it is suitable for the intended use, but may require different preferred heating times and temperatures.

While it is clear that the invention has been described in accordance with the preferred embodiment thereof, it will be apparent to those skilled in the art that various modifications thereof may be made without departing from the spirit and principles of the invention. It is therefore intended to cover the invention broadly being limited only by the appended claims.

What is claimed is:

1. An apparatus for the placement of a heat-shrinkable cover on a container comprising a support housing containing a heat-shrinkable film supply, film transport means comprised of film conveying, severing and holding means, said film conveying means being mounted for reciprical movement on scotch yoke crank arm means powered by electrical motor means, film heat-shrinking means comprised of heater and blower means, and electrical actuating means comprised of movable bonnet means, said film transport means comprising means for withdrawing a predetermined length of film from said film supply and film severing means, means for holding said severed film in operational alignment with said film-shrinking means by movement of a container to be covered vertically against said held film to contact and move said movable bonnet means, the movement of said bonnet means electrically actuating said blower and heater means, and the subsequent movement of said container away from said bonnet means initiating a recycle of said film transport means.

2. The apparatus of claim 1 wherein the film trnsport means has means for grasping the end of film to withdraw said film from a supply thereof and means for subsequently releasing said grasped and withdrawn film.

3. The apparatus of claim 1 wherein camming means are cooperatively synchronized with said crank arm to sequentially actuate film severing means, film clamping means and motor cut-off means.

4. The apparatus of claim 3 wherein the film severing means is an electrically heated element.

5. The apparatus of claim 1 wherein the film transport means has a centrally located opening therein across which opening is positioned said severed length of film.

6. The apparatus of claim 5 wherein the centrally located opening is of sufficient size to admit a container to be covered.

7. The apparatus of claim 6 wherein said vertically movable bonnet means is positioned above said opening for the receipt of said container to be covered.

* * * * *